United States Patent
Lo

(10) Patent No.: US 8,582,434 B1
(45) Date of Patent: *Nov. 12, 2013

(54) GENERALIZED AUTO MEDIA SELECTOR

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 211 days.

This patent is subject to a terminal disclaimer.

(21) Appl. No.: 13/023,389

(22) Filed: Feb. 8, 2011

Related U.S. Application Data

(63) Continuation of application No. 12/619,761, filed on Nov. 17, 2009, now Pat. No. 7,885,192, which is a continuation of application No. 11/201,111, filed on Aug. 10, 2005, now Pat. No. 7,619,975, and a continuation-in-part of application No. 10/435,301, filed on May 9, 2003, now Pat. No. 7,324,507, which is a continuation-in-part of application No. 09/991,046, filed on Nov. 21, 2001, now Pat. No. 7,054,309.

(60) Provisional application No. 60/667,731, filed on Apr. 1, 2005, provisional application No. 60/438,933, filed on Jan. 9, 2003.

(51) Int. Cl.
*G01R 31/06* (2006.01)

(52) U.S. Cl.
USPC ............ 370/235; 370/360; 370/384; 370/469

(58) Field of Classification Search
USPC .................................. 370/235, 360, 384, 469
See application file for complete search history.

(56) References Cited

U.S. PATENT DOCUMENTS

| | | | |
|---|---|---|---|
| 5,610,903 | A | 3/1997 | Crayford |
| 5,737,108 | A | 4/1998 | Bunch et al. |
| 5,922,052 | A | 7/1999 | Heaton |
| 5,936,962 | A | 8/1999 | Haddock et al. |
| 6,072,803 | A | 6/2000 | Allmond et al. |
| 6,073,006 | A | 6/2000 | Sawyer et al. |
| 6,154,464 | A | 11/2000 | Feuerstraeter et al. |
| 6,215,816 | B1 | 4/2001 | Gillespie et al. |
| 6,259,745 | B1 | 7/2001 | Chan |
| 6,272,173 | B1 | 8/2001 | Hatamian |
| 6,275,501 | B1 | 8/2001 | Lucas et al. |

(Continued)

FOREIGN PATENT DOCUMENTS

EP 0 986 217 3/2000

OTHER PUBLICATIONS

ANSI/IEEE Std. 802.3, 20000 Edition; Part 3: Carrier Sense Multiple Access With Collision Detection (CSMA/CD) Access Method and Physical Layer Specifications, Parts 1, 2, and 3.

(Continued)

*Primary Examiner* — Sai-Ming Chan

(57) ABSTRACT

A media selection system includes a plurality of media ports. Each of the plurality of media ports is coupled to a corresponding physical medium, and each of the plurality of media ports is configured to generate an activity signal and a link status signal. A priority storage module is configured to contain priority information, which sets forth a priority for establishing a link through each of the plurality of media ports. A media selector module is configured to select a first media port through which a link will be maintained based on the link status signal generated by each of the plurality of media ports and the priority information. The media selector module is further configured to block all other links through media ports of the plurality of media ports other than the first media port.

12 Claims, 5 Drawing Sheets

(56) References Cited

U.S. PATENT DOCUMENTS

| | | |
|---|---|---|
| 6,285,659 B1 | 9/2001 | Feuerstraeter et al. |
| 6,385,738 B1 | 5/2002 | Lo |
| 6,389,005 B1 | 5/2002 | Cruickshank |
| 6,389,480 B1 | 5/2002 | Kotzur et al. |
| 7,012,897 B1 | 3/2006 | Sowizral et al. |
| 7,020,729 B2 | 3/2006 | Taborek et al. |
| 7,023,873 B2 | 4/2006 | Gibson et al. |
| 7,054,309 B1 | 5/2006 | Hoot et al. |
| 7,230,957 B2 | 6/2007 | Kang et al. |
| 7,283,481 B2 | 10/2007 | Huff |
| 7,324,507 B1 | 1/2008 | Lo et al. |
| 7,356,047 B1 | 4/2008 | Mahalawat et al. |
| 7,373,526 B2 | 5/2008 | Hwang et al. |
| 7,376,146 B2 | 5/2008 | Beverly et al. |
| 7,394,825 B2 | 7/2008 | Kim et al. |
| 7,450,543 B2 | 11/2008 | Laroia et al. |
| 7,599,391 B1 | 10/2009 | Lo |
| 7,619,975 B1 | 11/2009 | Lo |
| 7,639,675 B1 | 12/2009 | Hoot et al. |
| 7,688,812 B1 | 3/2010 | Lo et al. |
| 7,885,192 B1 | 2/2011 | Lo |
| 7,907,605 B1 | 3/2011 | Hoot et al. |
| 8,018,923 B1 | 9/2011 | Lo et al. |
| 2003/0035410 A1 | 2/2003 | Laroia et al. |
| 2003/0179709 A1 | 9/2003 | Huff |
| 2003/0214979 A1 | 11/2003 | Kang et al. |
| 2003/0217215 A1 | 11/2003 | Taborek et al. |
| 2004/0022238 A1 | 2/2004 | Kimmit |
| 2004/0264961 A1 | 12/2004 | Nam et al. |
| 2005/0102419 A1 | 5/2005 | Popescu et al. |
| 2010/0141466 A1 | 6/2010 | Nguyen et al. |

OTHER PUBLICATIONS

IEEE Standard 802.3, Local and Metropolitan Area Networks: Physical Layer Link Signaling for 10 Mb/s, and 1000 Mb/s Auto-Negotiation on Twisted Pair, 2000 Edition, pp. 698-745; and 99-1009-1033.

IEEE, Std. 802.3, 2000 Edition, Local and Metropolitan Area Networks: Sections 28-38, pp. 698-1033.

IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specification, Amendment Media Access Control (MAC) Parameters, Physical Layers, and Management Parameters for 10 Gb/s Operation, IEEE Std 802.3ae-2002 Section 44, pp. 153-156; IEEE Std. 802.3ae-2002 Section 47, pp. 271-283; IEEE Std. 802.3ae-2002 Section 46, pp. 247-262.

IEEE Std. 802.3-2002 Section Three-35. Reconciliation Sublayer (RS) and Gigabit Media Independent Interface (GMII) pp. 5-31; IEEE Std. 802.3-2002 Section Two-22. Reconciliation Sublayer (RS) and Media Independent Interface (MII) pp. 9-49.

Altera Corporation, Stratix Device Handbook, vol. 2, Chapter 8. Implementing 10-Gigabit Ethernet Using Stratix Devices, Sep. 2004, pp. 1-24.

Hansel A. Collins and Ronald E. Nikel, TriCN Associates, LLC, DDR-SDRAM, High-Speed, Source-Synchronous Interfaces Create Design Challenges, Sep. 2, 1999, pp. 63-72.

GENERALIZED AUTO MEDIA SELECTOR

CROSS-REFERENCE TO RELATED APPLICATIONS

This application is a continuation of U.S. application Ser. No. 12/619,761 (now U.S. Pat. No. 7,885,192), filed on Nov. 17, 2009, which is a continuation of U.S. application Ser. No. 11/201,111 (now U.S. Pat. No. 7,619,975), filed on Aug. 10, 2005, which claims the benefit of U.S. Provisional Application No. 60/667,731, filed on Apr. 1, 2005. The disclosures of the above applications are hereby incorporated by reference herein in their entirety. U.S. application Ser. No. 11/201,111 (now U.S. Pat. No. 7,619,975), filed on Aug. 10, 2005, is a continuation-in-part of U.S. application Ser. No. 10/435,301 (now U.S. Pat. No. 7,324,507), filed on May 9, 2003, which is a continuation-in-part of U.S. application Ser. No. 09/991,046 (now U.S. Pat. No. 7,054,309), filed on Nov. 21, 2001 and claims the benefit of U.S. Provisional Application No. 60/438,933, filed on Jan. 9, 2003.

TECHNICAL FIELD

The present invention relates to computer networks, and more particularly to an automatic media selector.

BACKGROUND

Referring now to FIG. 1, a data link layer 10 of the open systems interconnection (OSI) model includes a logical link control (LLC) layer 12 and a media access control (MAC) layer 14. The LLC layer 12 addresses and exchanges data with a network layer 16. The MAC layer 14 provides an interface between the LLC layer 12 and a physical layer device 18. The MAC layer 14 frames data for transmission over the network and then passes the frame to the physical layer device 18 for transmission as a stream of bits. In other words, the MAC layer 14 frames data into distinct units or packets that are transmitted one at a time over the network.

The physical layer device 18 typically includes a physical coding sublayer (PCS) 20, a physical medium attachment (PMA) sublayer 22, and an autonegotiation sublayer 24. A medium dependent interface (MDI) 26 connects the physical layer device 18 to media 28 such as twisted pair wires, optical fiber, or other media. The IEEE 802.3 specification, which is hereby incorporated by reference in its entirety, further defines how physical network interfaces operate with different types of media such as coaxial cable, twisted-pair cable, and optical fiber.

The autonegotiation sublayer 24 initiates the exchange of information between two connected network devices and automatically configures the devices to take maximum advantage of their respective abilities. The autonegotiation sublayer 24 advertises the abilities of the network device, acknowledges receipt, identifies common modes of operation, and rejects the use of operational modes that are not shared or supported by both devices. When more than one common mode of operation exists between the devices, an arbitration function of the autonegotiation layer 24 identifies and selects a single mode of operation. After autonegotiation is complete, the devices establish a link and exchange data.

To improve flexibility, the physical layer device 18 of some network devices has been designed to be connected to different types or speeds of media. Alternatively, multiple physical layer devices may be present to handle different types or speeds of media. The manufacturer and/or the user may not know a priori the types or speeds of media that will be used, and the media used may change over time.

SUMMARY

A media selection system includes a plurality of media ports. Each of the plurality of media ports is coupled to a corresponding physical medium, and each of the plurality of media ports is configured to generate an activity signal and a link status signal. A priority storage module is configured to contain priority information, which sets forth a priority for establishing a link through each of the plurality of media ports. A media selector module is configured to select a first media port through which a link will be maintained based on the link status signal generated by each of the plurality of media ports and the priority information. The media selector module is further configured to block all other links through media ports of the plurality of media ports other than the first media port.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided after. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
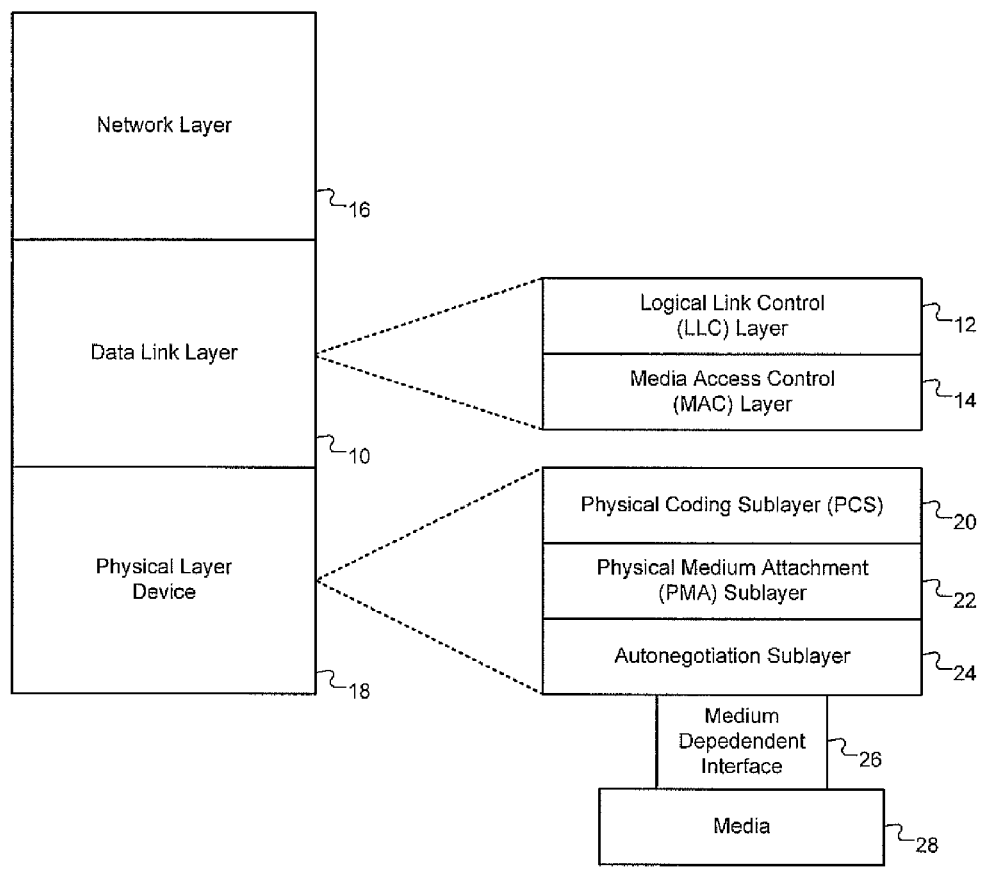
FIG. 1 is a diagram of the open systems interconnection (OSI) model.

The following description of the preferred embodiments is merely exemplary in nature and is in no way intended to limit the invention, its application, or uses. For purposes of clarity, the same reference numbers will be used in the drawings to identify similar elements. As used, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
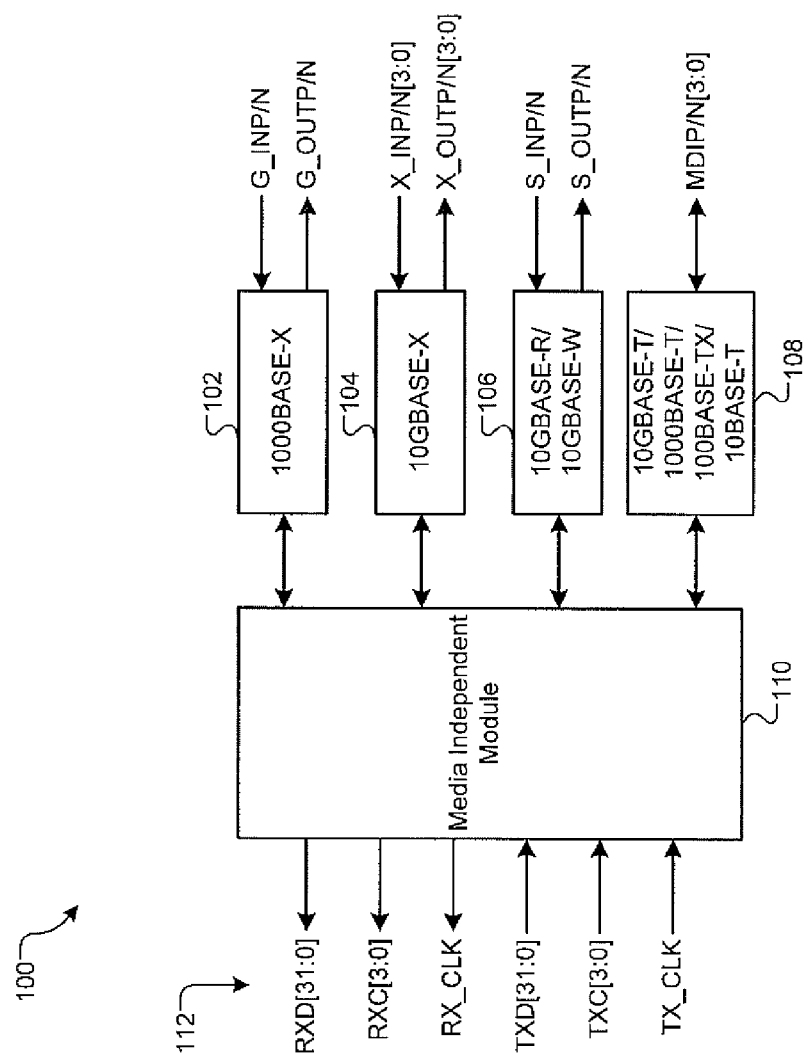
FIG. 2 is a functional block diagram of an exemplary physical layer device (PHY)

Referring now to FIG. 2, an exemplary physical layer device (PHY) 100 is depicted. The exemplary PHY 100 includes N media ports. In this implementation, N is equal to four. The N ports include a fiber 1000BASE-X first port 102, a parallel 10GBASE-X second port 104, a LAN/WAN serial 10GBASE-R/10GBASE-W third port 106, and a copper 10GBASE-T/1000BASE-T/100BASE-TX/10BASE-T fourth port 108. One skilled in the art will recognize that a PHY may have additional or fewer media ports, and the media ports may be of different type.

The media ports 102, 104, 106, and 108 communicate with a media independent module 110. The media independent module 110 provides a media independent interface 112, such as with XGMII/GMII/MII signals, as shown in the exemplary PHY 100. Alternatively, the interface may be a XAUI interface, or an extended XGMII interface, disclosed in "Media And Speed Independent Interface," U.S. patent application Ser. No. 11/114,842, filed Apr. 26, 2005, which is hereby incorporated by reference in its entirety.

Each of the media ports is able to sense when there is energy (or activity) on its physical media. The first media port 102 is shown receiving signal G_INP/N and transmitting G_OUTP/N. The second media port 104 is shown receiving signals X_INP/N[3:0] and transmitting X_OUTP/N[3:0]. The third media port 106 is shown receiving signal S_INP/N and transmitting S_OUTP/N. The fourth media port 108 is shown communicating signals MDIP/N[3:0]. These signals are media and implementation dependent. As described below, the media independent module 110 chooses one media port to connect with the media independent interface 112.

Each of the media ports is capable of sensing whether there is activity (or energy) on its physical medium. This information is communicated to the media independent module 110 in the form of activity signals. Each of the media ports also communicates its network link status to the media independent module 110 in the form of link signals. One skilled in the art will recognize that the activity and link signals may be multiplexed over the same physical connection.

Figure 3:
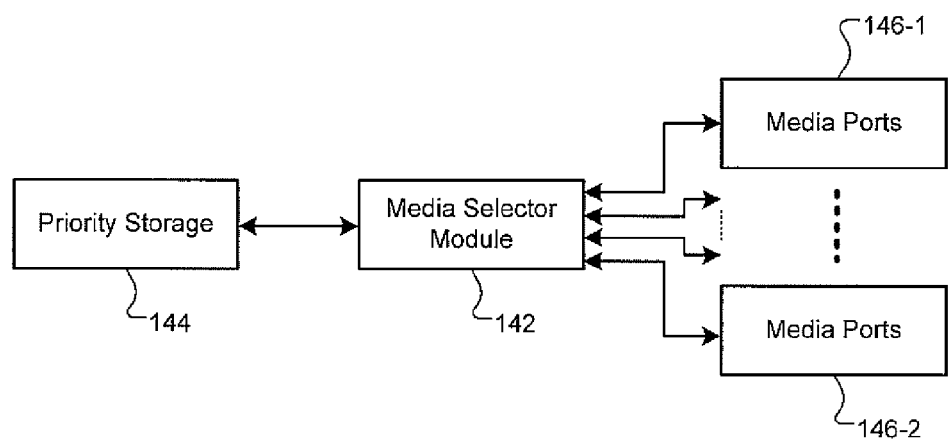
FIG. 3 is a functional block diagram of an exemplary media selection system for a PHY.

Referring now to FIG. 3, a functional block diagram of an exemplary media selection system for a PHY is presented. A media selector module 142 communicates with a priority storage module 144. The media selector module 142 communicates with at least two media ports 146. The priority storage module 144 contains information regarding priority of the media ports 146, i.e., which media port is preferred with respect to other media port for establishing a connection. The priority information assigns a distinct priority to each media port 146, such that a list can be formed with the highest priority media port at the top and the lowest priority media port at the bottom. The media selector module 142 uses the priority information to maintain a link on the highest priority media port 146 that is possible. This priority information may be default or pre-programmed values, or may be set by the end user.

Figure 4:
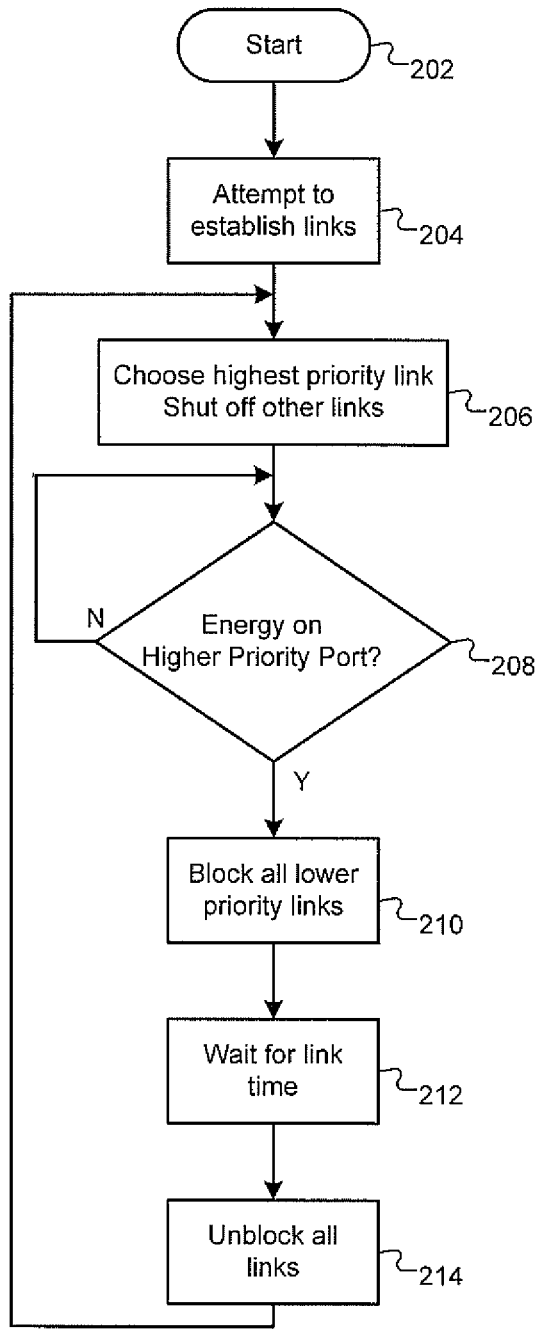
FIG. 4 is a flow chart depicting exemplary steps performed by a media selection system according to the principles of the present invention.

Referring now to FIG. 4, a flow chart depicts exemplary steps taken by the media selector module 142 in determining which media port will be selected. Control starts at step 202 and transfers to step 204. In step 204, control attempts to establish links on all of the media ports. Control then transfers to step 206, where the established link of the highest priority port is chosen and all other links are blocked. Blocked links operate in a minimal power mode, with only a low-power circuit to detect energy on the physical media. Control then transfers to step 208. In step 208, control determines whether energy is sensed on a higher priority port. If so, control transfers to step 210; otherwise, control remains in step 208.

In step 210, ports with a priority below the higher priority port of step 208 are blocked. Optionally, the lower priority port on which a link is currently established can remain on, pending a link being established on the higher priority port of step 208. Power constraints of the PHY 18 may only allow for one link at a time, in which case all lower priority ports will be blocked. In step 212, a timer is set, and upon expiration of the timer, control transfers to step 214. The timer value is set based on the time typically (or alternately, maximally) required for the media of the higher priority port of step 208 to establish a link. In step 214, all links are unblocked and control returns to step 206.

Figure 5:
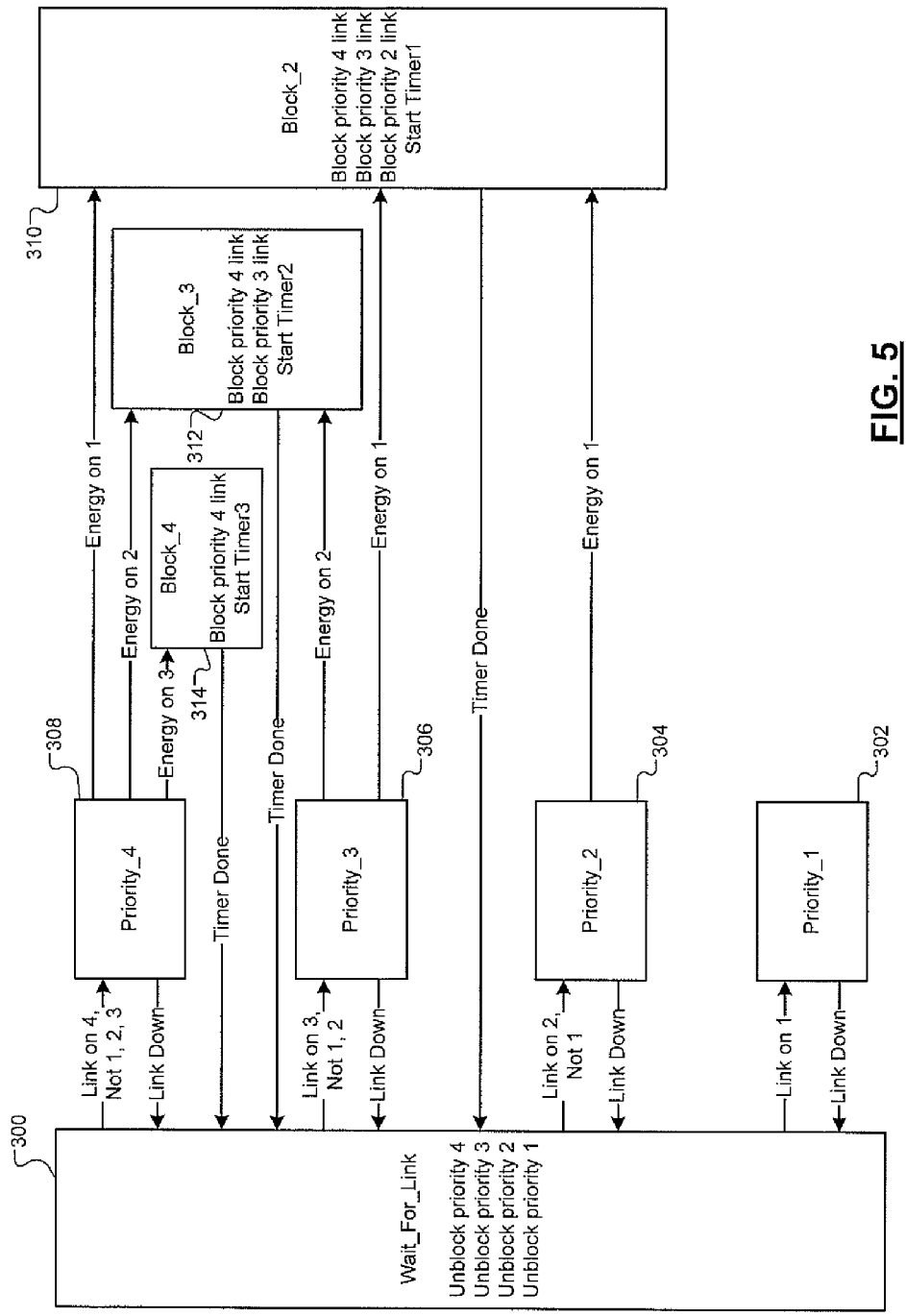
FIG. 5 is an exemplary state diagram of a media selection system according to the principles of the present invention.

Referring now to FIG. 5, a state diagram of an exemplary media selection system according to the principles of the present invention is presented. In this exemplary media selection system, four media ports and therefore four corresponding priority levels are present. Each media port is assigned a distinct priority level. The media port with the highest priority (the most preferable network link) is referred to as port one, the media port with the second highest priority is port two, etc. One skilled in the art will recognize that more or fewer ports may be employed. Control begins in state 300, where all four ports are unblocked and each attempts to establish a link. If a link is established on port one, control transfers to state 302. If no link is established on port one, but a link is established on port two, control transfers to state 304; otherwise, if a link is established on port three, control transfers to state 306; otherwise, if a link is established on port four, control transfers to state 308.

In state 302 ports two through four are blocked. If the established link goes down, control returns to state 300. In state 304 ports one, three, and four are blocked. If the established link goes down, control returns to state 300. If, in state 304, energy is sensed on port one, control transfers to state 310. In state 310 ports two, three, and four are blocked and a timer is started. The timer value is based on the typical (or optionally, maximum expected) time required for a link to be established on the physical media used by port one. When the timer is done, control transfers to state 300. This timed delay gives the (preferred) port one a head start in establishing a link.

In state 306 ports one, two, and four are blocked. If the established link goes down, control returns to state 300. If, in state 306, energy is sensed on port one, control transfers to state 310. Otherwise, if energy is sensed on port two, control transfers to state 312. In state 312 ports three and four are blocked and a timer is started with a value corresponding to port two. When the timer is done, control returns to state 300.

In state 308 ports one through three are blocked. If the established link goes down, control returns to state 300. If energy is sensed on port one, control transfers to state 310. Otherwise, if energy is sensed on port two, control transfers to state 312; otherwise, if energy is sensed on port three, control transfers to state 314. In state 314 port four is blocked and a timer is started with a value corresponding to port three. When the timer is done, control returns to state 300. Selective blocking depends upon power requirements. If the physical layer device can support the power draw of multiple simultaneous links, the port with a currently active link may remain unblocked until the higher priority port has actually established a link.

One skilled in the art will recognize that there are various methods of detecting and qualifying energy. A partial discussion of how to detect energy on physical media is presented in "Ethernet Automatic Media Selection Logic," U.S. patent application Ser. No. 09/991,046, filed Nov. 21, 2001, and "Ethernet Automatic Media Selection Logic With Preferred Medium Selector," U.S. patent application Ser. No. 10/435, 301, filed May 9, 2003, which are both hereby incorporated by reference in their entirety.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A media selection system comprising:
a plurality of media ports, each of the plurality of media ports being coupled to a corresponding physical medium, each of the plurality of media ports being configured to
generate an activity signal indicting whether activity is sensed on the corresponding physical medium associated with the media port, and
generate a link status signal indicating a network link status through the corresponding physical medium associated with the media port;
a priority storage module configured to contain priority information, the priority information setting forth a priority for establishing a link through each of the plurality of media ports; and
a media selector module configured to
select a first media port of the plurality of media port through which a link will be maintained based on (i) the link status signal generated by each of the plurality of media ports and (ii) the priority information, and
block all other links through media ports of the plurality of media ports other than the first media port,
wherein, in response to an activity signal being generated by a second media port having a higher priority than the first media port, the media selector is configured to block all other media ports other than the second media port responsive to a link being established through the second media port.

2. The media selection system of claim 1, wherein the priority information associates each of the plurality of media ports with a unique priority level.

3. The media selection system of claim 1, wherein the priority storage module comprises one or more of an application specific integrated circuit (ASIC), an electronic circuit, a processor, a combination logic circuit, or a memory.

4. The media selection system of claim 1, wherein the first media port has a highest priority among other media ports of the plurality of media ports having an established link.

5. The media selection system of claim 1, wherein the plurality of media ports comprise one or more of a fiber 1000BASE-X port, a parallel 10GBASE-X port, a serial 10GBASE-R/10GBASE-W port, or a copper 10GBASE-T/1000BASE-T/100BASE-TX/10BASE-T port.

6. The media selection system of claim 1, further comprising a media independent interface configured to connect to the first media port.

7. The media selection system of claim 6, wherein the media independent interface comprises a XAUI interface.

8. The media selection system of claim 6, wherein the media independent interface comprises an extended XGMII interface.

9. A method for selecting a media port from among a plurality of media ports through which a link will be maintained, each of the plurality of media ports being coupled to a corresponding physical medium, the method comprising:
for each of the plurality of media ports, generating a link status signal indicating a network link status through the corresponding physical medium associated with the media port;
selecting a first media port of the plurality of media port through which a link will be maintained based on (i) the link status signal generated by each of the plurality of media ports and (ii) priority information, wherein the priority information sets forth a priority for establishing a link through each of the plurality of media ports; and
blocking all other links through media ports of the plurality of media ports other than the first media port,
wherein, in response to activity being sensed on a corresponding physical medium associated with a second media port having a higher priority than the first media port, blocking all other media ports other than the second media port responsive to a link being established through the second media port.

10. The method of claim 9, wherein the priority information associates each of the plurality of media ports with a unique priority level.

11. The method of claim 9, wherein the first media port has a highest priority among other media ports of the plurality of media ports having an established link.

12. The method of claim 9, wherein the plurality of media ports comprise one or more of a fiber 1000BASE-X port, a parallel 10GBASE-X port, a serial 10GBASE-R/10GBASE-W port, or a copper 10GBASE-T/1000BASE-T/100BASE-TX/10BASE-T port.

* * * * *